(12) United States Patent
Tamachi et al.

(10) Patent No.: US 8,976,508 B2
(45) Date of Patent: Mar. 10, 2015

(54) ELECTROCHEMICAL CELL

(71) Applicant: Seiko Instruments Inc., Chiba-shi, Chiba (JP)

(72) Inventors: Tsuneaki Tamachi, Chiba (JP); Ryo Sato, Chiba (JP); Kenji Ogata, Chiba (JP); Isamu Shinoda, Chiba (JP); Shunji Watanabe, Chiba (JP)

(73) Assignee: Seiko Instruments Inc., Chiba (JP)

( * ) Notice: Subject to any disclaimer, the term of this patent is extended or adjusted under 35 U.S.C. 154(b) by 0 days.

(21) Appl. No.: 14/062,316

(22) Filed: Oct. 24, 2013

(65) Prior Publication Data

US 2014/0049878 A1    Feb. 20, 2014

Related U.S. Application Data

(63) Continuation of application No. PCT/JP2012/061868, filed on May 9, 2012.

(30) Foreign Application Priority Data

May 12, 2011    (JP) ................................. 2011-107552

(51) Int. Cl.
*H01G 9/00* (2006.01)
*H01G 11/80* (2013.01)
(Continued)

(52) U.S. Cl.
CPC .......... *H01G 11/80* (2013.01); *H01M 10/0585* (2013.01); *H01G 11/82* (2013.01);
(Continued)

(58) Field of Classification Search
CPC ........ H01G 9/2013; H01M 2/02; H01M 2/08; H01M 2/14; H01M 2/20; H01M 8/10; H01M 8/24
USPC ......... 361/502–504, 512–514, 516–519, 525, 361/528–529
See application file for complete search history.

(56) References Cited

U.S. PATENT DOCUMENTS 7,541,111 B2 * 6/2009 Itoh et al. ...................... 429/175
7,651,813 B2 * 1/2010 Yokoi et al. ................... 429/163

FOREIGN PATENT DOCUMENTS

JP      59-083340 A    5/1984
JP      62-31144 A     2/1987
(Continued)

OTHER PUBLICATIONS

Office Action, and English translation thereof, in corresponding Japanese Application No. 2013-514029, dated Oct. 29, 2013, 6 pages.
International Search Report for International Application No. PCT/JP2012/061868, dated Jul. 17, 2012, 1 page.
Office Action with English Translation for Japanese Patent Application Serial No. 2013-514029 mailed Sep. 2, 2014, 4 pages.

*Primary Examiner* — Nguyen T Ha
(74) *Attorney, Agent, or Firm* — Brinks Gilson & Lione; G. Peter Nichols

(57) ABSTRACT

The electrochemical cell of the present invention is provided with a hermetic container having a base member, a jointing material fixed to the base member, and a lid member welded on the base member via the jointing material, and in which a housing space sealed between the base member and the lid member is defined, and an electrochemical element which is housed inside the housing space and which is available to effect charging and discharging, wherein the lid member is made of stainless steel.

9 Claims, 6 Drawing Sheets

(51) Int. Cl.
*H01G 11/82* (2013.01)
*H01M 2/02* (2006.01)
*H01M 2/04* (2006.01)
*H01M 2/08* (2006.01)
*H01G 2/10* (2006.01)
*H01M 10/0585* (2010.01)

(52) U.S. Cl.
CPC ............. Y02E 60/13 (2013.01); *H01M 2/0277* (2013.01); *H01M 2/0426* (2013.01); *H01M 2/08* (2013.01); *H01M 2/0217* (2013.01); *H01M 2/0486* (2013.01); *H01M 2/0495* (2013.01); *H01G 2/103* (2013.01)
USPC ........... 361/502; 361/503; 361/504; 361/512; 361/525; 361/528

(56) References Cited

FOREIGN PATENT DOCUMENTS

| | | |
|---|---|---|
| JP | 03-093150 | 4/1991 |
| JP | 07-057718 A | 3/1995 |
| JP | 8-290272 A | 11/1996 |
| JP | 2001-216952 A | 8/2001 |
| JP | 2004-154999 A | 6/2004 |
| JP | 2004-227959 A | 8/2004 |
| JP | 2004-281156 | 10/2004 |
| JP | 2007-012921 A | 1/2007 |
| JP | 2008-235531 A | 10/2008 |
| JP | 2010-161097 A | 7/2010 |
| JP | 2010-165909 A | 7/2010 |
| JP | 2010-201695 A | 9/2010 |

* cited by examiner

ELECTROCHEMICAL CELL

RELATED APPLICATIONS

This application is a continuation of PCT/JP2012/061868 filed on May 9, 2012, which claims priority to the Japanese Application No. 2011-107552 filed on May 12, 2011. The entire contents of these applications are incorporated herein by reference.

TECHNICAL FIELD

The present invention relates to an electrochemical cell such as a non-aqueous electrolyte secondary battery and an electric double-layer capacitor.

BACKGROUND ART

An electrochemical cell has been used as a backup power source of memories and a backup power source of clock functions in various types of small-sized electronic devices such as a cellular phone, a personal digital assistant (PDA) and a portable game machine. In recent years, there has been a growing demand for this type of electrochemical cell to be decreased in size and thickness. This is because an electronic device on which an electrochemical cell is mounted has been made smaller. Further, an electrochemical cell is commonly packaged by reflow soldering (a method in which a soldering cream-coated electrochemical cell is placed on a packaging substrate and heated together with a circuit substrate to effect soldering). For this reason, heat resistance is required for an electrochemical cell so as to withstand heat resulting from reflow soldering.

Conventional electrochemical cells are available mostly in the shape of a coin in which a cell case is crimped and sealed. Therefore, these cells are unable to effectively use a packaging area, which inhibits space saving. Further, on reflow soldering, terminals, etc., require welding in advance and the number of components and manufacturing steps are increased, resulting in a rise in cost.

Therefore, in order to solve the above-described type of problems, the tests have been conducted for an electrochemical cell substantially in the shape of a square (chip-shape) which is able to use a packaging area effectively. This chip-type electrochemical cell is different from a coin-shaped electrochemical cell and cannot be sealed by crimping a can (case). Therefore, such an electrochemical cell has been provided that a recessed container is welded on a sealing plate to internally seal electrodes, etc. (refer to Patent Document 1).

PRIOR ART DOCUMENT

Patent Document
Patent Document 1: Japanese Published Unexamined Patent Application No. 2004-227959

In the electrochemical cell disclosed in Patent Document 1, an electrolyte solution which contains an organic solvent is housed inside a recessed container and a metal sealing plate is welded on an open portion of the recessed container via a metal ring, thereby sealing the recessed container. In this case, in view of matching thermal expansion of the ceramic-made recessed container, the sealing plate and the metal ring are suitably made of Kovar (an alloy composed of Co: 17% by weight, Ni: 29% by weight and Fe: remaining percentage). Further, a surface opposing the sealing plate and that opposing the metal ring are individually plated with nickel as a jointing material on welding.

Meanwhile, in a chip-type electrochemical cell, a sealing plate and a metal ring are commonly connected to a negative-electrode active material. Therefore, they are usually kept at a potential on the side of reduction and considered not to be melted. There is, however, found a case that prolonged use of an electrochemical cell has caused functional troubles such as decomposition of an electrolyte solution and elution of a metal used in the sealing plate, the metal ring and the jointing material.

More specifically, there is found such a problem that nickel used as the jointing material melts during application of voltage resulting from repetition of charging and discharging or during retention of that voltage, and in particular, leakage current is increased on charging, thus resulting in a decrease in charging efficiency.

The present invention has been made in view of the above situation, an object of which is to provide an electrochemical cell which is capable of suppressing a decrease in charging efficiency and stable in quality for a prolonged period of time.

SUMMARY OF THE INVENTION (1) An electrochemical cell of the present invention is provided with a hermetic container having a base member, a jointing material fixed to the base member, and a lid member welded on the base member via the jointing material, and in which a housing space sealed between the base member and the lid member is defined, and an electrochemical element which is housed inside the housing space and which is available to effect charging and discharging, wherein the lid member is made of stainless steel.

According to the electrochemical cell of the present invention, the lid member which has been welded on the base member via the jointing material is stainless steel, the surface of which is covered with a dense and stable oxide layer and, therefore, excels in corrosion resistance more than a Ni-based alloy such as Kovar commonly used as a material of the lid member. In particular, the lid member contains chromium and therefore has a dense oxide layer. For this reason, a base metal of the lid member is protected by the oxide layer and the base metal which contains nickel is less likely to flow out when welded on the base member. Further, in the first place, nickel contained in stainless steel is 14% or less and, lower than the content of Kovar (29%). That is, the base metal of the lid member can be made less likely to flow out on welding and even if it should flow out, nickel is contained less in compositions which have flowed out.

Therefore, it is possible to prevent an increase in leakage current on charging and suppress a decrease in charging efficiency. It is, thereby, possible to provide an electrochemical cell which is stable in quality over a prolonged period of time.

Further, as described above, since the oxide layer which has been formed on the surface of the lid member is stable, the oxide layer is hardly peeled off by flaws, etc., thus making it possible to suppress exposure of the base metal of the lid member. In this regard as well, it is possible to prevent an increase in leakage current on charging and suppress a decrease in charging efficiency. Further, the lid member can be easily handled to improve assembling workability of the electrochemical cell. Still further, since stainless steel is easily available and low in price, the electrochemical cell per se can easily be reduced in cost.

It is noted that any one of the following stainless steels can be used as the above-described stainless steel.

(a) Austenite/ferrite two-phase stainless steel,
(b) Austenitic stainless steel,
(c) Precipitation hardening stainless steel, (d) Ferritic stainless steel, and (e) Martensitic stainless steel.

In particular, the lid member is more likely to undergo pitting corrosion due to variance in voltage on charging and discharging. Therefore, it is preferable to select a material high in pitting corrosion resistance. And, the above-described (a) austenite/ferrite two-phase stainless steel is most preferable.

(2) A metal layer which is composed of a metal material selected from any one of Au, Sn, Cu, Ag, Ir, Pd and Rh or an alloy containing at least one of these metal materials may be coated at a part which is in contact with at least an electrode of the electrochemical element on the surface of the lid member.

In this case, since the base metal of the lid member is protected not only by the oxide layer but also by the metal layer, the base metal is less likely to be exposed by flaws or the like. And, the base metal of the lid member is further less likely to flow out when the lid member is welded on the base member.

In addition, when Au, Cu, Ag, Ir, Pd, Rh and Sn or an alloy thereof is used, they are metals which are less likely to undergo oxidation than nickel, theretofore, low in ionization tendency and less likely to flow out. Thus, nickel contained in the base metal of the lid member is less likely to flow out together with these metals.

In view of the above facts, it is possible to effectively suppress a decrease in charging efficiency due to an increase in leakage current on charging. Therefore, it is possible to provide an electrochemical cell excellent in cycle characteristics on charging and discharging.

(3) The metal layer may be coated all over at the part which is in contact with the jointing material.

In this case, on welding the lid member, the metal layer and the jointing material can be melted to each other and fused, by which the base member can be welded more firmly on the lid member via the metal layer and the jointing material. Therefore, the housing space at which the electrochemical element has been housed can be increased in sealing property to provide the electrochemical cell which is more stable in quality.

(4) A primer layer which is composed of Ni or Cu may be formed between the metal layer and the lid member.

In this case, since the metal layer is formed on the primer layer, the metal layer can be coated on the lid member stably and firmly. Therefore, the above-described actions and effects can be obtained more significantly.

Further, for example, where the metal layer is coated all over at the part in contact with the jointing material and also where the jointing material and the primer layer are formed by using nickel, the jointing material more favorably fits with the primer layer and they can be jointed firmly at high compatibility. Therefore, the base member can be welded more firmly on the lid member via the metal layer and the jointing material.

(5) The lid member may be formed so as to be 30 μm or less in thickness.

In this case, since the lid member is 30 μm or less in thickness, it is possible to suppress defects occurring on the electrochemical cell such as cracks and undesirable deformation due to thermal influences on welding the lid member when the electrochemical cell is assembled.

In other words, when the lid member is welded (by seam welding, laser beam welding, etc.), electricity is supplied intermittently in a pulse-like cycle by seam welding, for example. Thus, a part to which electricity has been supplied undergoes local heating. Further, laser beam is irradiated intermittently in a pulse-like cycle also by laser beam welding, by which a part to which the laser beam has been irradiated undergoes local heating. In both cases, heat is transferred via the jointing material at least to a part of the base member on the side of the jointing material. Therefore, the lid member and the above-described part of the base member are thermally expanded. Then, after welding, the lid member and the above-described part of the base member are cooled to allow contraction. At this time, since they have different thermal contraction coefficients, stress occurs. Thereby, stress concentrates at least on the above-described part of the base member, for example, and cracks and undesirable deformation are more likely to occur.

However, since the lid member is 30 μm or less in thickness, it is possible to suppress influences of thermal contraction by the lid member, and the stress can be decreased to suppress occurrence of defects such as cracks and undesirable deformation.

(6) The jointing material may be an electrically-conductive seal ring which is formed in the shape of a ring so as to surround the housing space.

In this case, since the lid member is welded via the electrically-conductive seal ring, the housing space can be hermetically sealed more reliably.

(7) The lid member may be such that an outer peripheral part thereof is in alignment with an outer peripheral part of the seal ring.

In this case, since the lid member is externally formed in such a manner that the outer peripheral part thereof is in alignment with the outer peripheral part of the seal ring, it is possible to carry out favorable welding. For example, where a roller electrode is used to carry out seam welding, the roller electrode can be reliably brought into contact with the lid member to supply electricity without fail, thereby attaining favorable welding. Further, where laser beam welding is carried out, a region on which the seal ring is in contact with the lid member can be sufficiently secured to facilitate irradiation of a laser beam, thereby attaining favorable welding.

(8) The seal ring may be greater in thickness than the lid member.

In this case, the seal ring is less likely to undergo thermal expansion by thermal influences on welding. It is also possible to easily suppress thermal expansion of the base member due to transfer of heat via the seal ring to the base member side. Therefore, it is possible to suppress occurrence of defects such as cracks and undesirable deformation resulting from thermal influences.

(9) It is preferable that the base member be formed in the shape of a closed-end tube having a flat-plate-like bottom wall portion and a frame-like peripheral wall portion, the lid member be welded on an upper surface of the peripheral wall portion of the base member via the jointing material by seam welding in which welded parts are overlapped continuously on a boundary surface between the lid member and the jointing material, and a wall thickness T (μm) of the peripheral wall portion and a welded diameter φ (μm) of the welded parts satisfy the following formula (1).

$$\frac{\text{Welded diameter } \varphi}{\text{Wall thickness } T} < 0.5 \qquad (1)$$

In this case, on assembling an electrochemical cell, it is possible to suppress occurrence of defects such as cracks and undesirable deformation on the electrochemical cell due to thermal influences when the lid member is welded.

In other words, on welding the lid member (by seam welding and laser beam welding, etc.), heat thereof is transferred via the jointing material to the peripheral wall portion of the base member, by which the lid member and the peripheral wall portion undergo thermal expansion. Then, after completion of welding, the lid member and the peripheral wall portion are cooled to undergo contraction. However, here, they are different in thermal contraction coefficient and stress occurs. Thereby, the stress concentrates on the peripheral wall portion and defects such as cracks and undesirable deformation are likely to occur.

In particular, where the peripheral wall portion is thin in wall thickness, strength (stiffness) is decreased, resulting in easy occurrence of the above-described defects. Further, where the welded diameter is great, electric current on welding is also great in quantity, resulting in excessive transfer of heat, and the above-described defects are also likely to occur.

Thus, the wall thickness T (μm) of the peripheral wall portion and the welded diameter φ (μm) of the welded part are adjusted so as to satisfy the formula (1). Thereby, an increase in wall thickness of the peripheral wall portion and a decrease in welded diameter can be made sufficiently compatible to suppress occurrence of the above-described defects.

(10) The lid member may be welded by repeating the seam welding several times.

In this case, for example, welded parts on first welding and welded parts on second welding can be continuously overlapped with each other. It is, thereby, possible to carry out welding more reliably and hermetically seal the housing space more reliably.

In particular, welding is carried out several times, by which a welded diameter for one time of welding can be made as small as possible to suppress the above defects more effectively.

According to the electrochemical cell of the present invention, the stainless steel-made lid member is welded on the base member to seal the electrochemical element inside the housing space. Therefore, it is possible to suppress nickel from flowing out on welding and also to suppress a decrease in charging efficiency due to an increase in leakage current on charging. As a result, it is possible to provide an electrochemical cell which is stable in quality for a prolonged period of time and also excellent in cycle characteristics on charging and discharging.

DETAILED DESCRIPTION OF THE PREFERRED EMBODIMENTS

Hereinafter, a description will be given of an embodiment of the electrochemical cell according to the present invention with reference to the drawings. In the present embodiment, a description will be given, as one example of the electrochemical cell, by exemplifying a surface-package type electric double-layer capacitor whose outer appearance is formed substantially in the shape of a rectangular solid chip.

(Configuration of Electric Double-Layer Capacitor)

Figure 1:
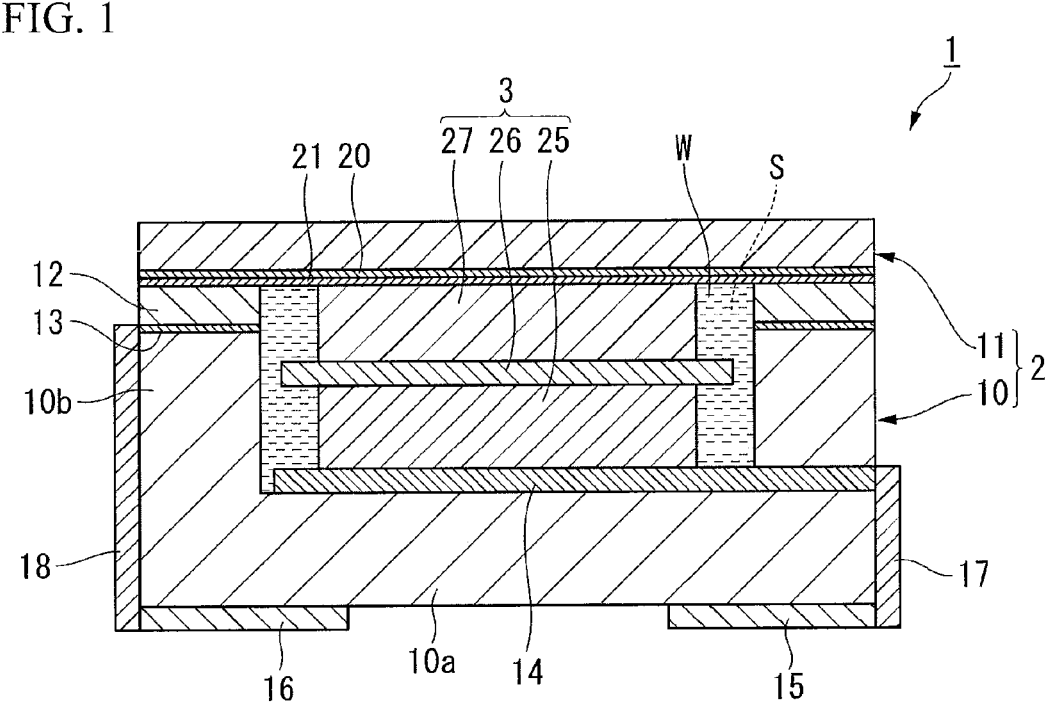
FIG. 1 is a longitudinal sectional view of a chip-type electric double-layer capacitor which shows an embodiment of the present invention.

As shown in FIG. 1, an electric double-layer capacitor 1 is provided with a hermetic container 2 having a housing space S sealed thereinside and an electrochemical element 3 which is housed inside the housing space S and capable of storing and charging electricity. And, this is an electrochemical device which can be surface-packaged on a substrate (not illustrated) by reflow, for example.

The hermetic container 2 is provided with a container main body (base member) 10 and a sealing plate (lid member) 11 which is welded on the container main body 10 via an electrically-conductive seal ring (jointing material) 12 to be described later.

The container main body 10 is formed with a material such as ceramic and glass and given as a recessed container having a flat-plate-like bottom wall portion 10a and a frame-like peripheral wall portion 10b in the shape of a closed-end tube. A recessed portion is defined by the bottom wall portion 10a and the peripheral wall portion 10b. And, the recessed portion is blocked and sealed by the sealing plate 11.

The above description will be described in detail. A joint layer 13 is formed on an upper surface of the peripheral wall portion 10b of the container main body 10 so as to surround the recessed portion from outside in a radial direction and the seal ring 12 is fixed to the joint layer 13. The sealing plate 11 is stacked on the container main body 10 via the seal ring 12 and hermetically jointed to the container main body by fusion of the seal ring 12. Then, a space which is defined by the recessed portion of the container main body 10 and the sealing plate 11 is given as the hermetically sealed housing space S.

It is noted that the seal ring 12 of the present embodiment can be formed by using nickel-plated stainless steel or a nickel-based alloy, which is one of those selected from, for example, Kovar (alloy composed of Co: 17% by weight, Ni: 29% by weight, Fe: remaining percentage), Elinvar (alloy composed of Co: 12% by weight, Ni: 36% by weight, Fe: remaining percentage), Invar (alloy composed of Ni: 36% by weight, Fe: remaining percentage), 42-Alloy (alloy composed of Ni: 42% by weight and Fe: remaining percentage) and the stainless steel used in the sealing plate 11.

The joint layer 13 is preferably formed with, for example, nickel or gold which fits with the seal ring 12. A method for forming the joint layer 13 may include not only electrolytic plating and electroless plating but also a vapor phase method such as a vacuum evaporation method.

A collector 14 is formed substantially all over on an upper surface of the bottom wall portion 10a of the container main body 10 facing the housing space S. Further, a pair of external connecting terminals 15, 16 are formed on a lower surface of the bottom wall portion 10a of the container main body 10 in an electrically disconnected state.

Of these external connecting terminals 15, 16, one external connecting terminal 15 is conducted to the collector 14 via a side electrode 17 formed on a side surface of the container main body 10. The other external connecting terminal 16 is conducted to the joint layer 13 via a side electrode 18 formed on a side surface of the container main body 10.

The above description will be described in detail.

The collector 14 extends up to a side surface of the container main body 10 on the side where one external connecting terminal 15 is formed. Then, one side electrode 17 is formed on a side surface of the bottom wall portion 10a in the container main body 10 so that the collector 14 extended up to the side surface is connected to the external connecting terminal 15. Meanwhile, the other side electrode 18 is formed all over on the bottom wall portion 10a and the side surfaces of the peripheral wall portion 10b in the container main body 10 so that the joint layer 13 formed on the upper surface of the peripheral wall portion 10b in the container main body 10 is connected to the other external connecting terminal 16.

The pair of external connecting terminals 15, 16 and the side electrodes 17, 18 are given as a single layer made of a single metal or a stacked layer of with different metals, for example, by plating and sputtering. The stacked layer may be available in two or three layers. However, in order to attain favorable reflow with a substrate, for example, preferable is a three-stacked layer in which a primer layer is nickel, an intermediate layer is gold and a surface layer is a soldered layer.

The above-described collector 14 is preferably made of tungsten, silver or gold which is excellent in corrosion resistance and formable by a film pressure method. Further, in order to prevent dissolving into a liquid electrolyte W to be described later on application of an electropositive potential, the collector may be configured with a valve metal (valve action metal: metal on which a corrosion resistant passive film is formed) or with carbon. The valve metal includes aluminum, titanium, tantalum, niobium, hafnium and zirconium. And in particular, aluminum or titanium is preferably used.

Further, it is also preferable that a chromium layer be used as a primer layer and the collector 14 be formed on the primer layer. The primer layer is formed such that the collector 14 can be more firmly adhered to the container main body 10. As the primer layer, a titanium layer is preferably used other than the chromium layer. The titanium layer can be used not only as the primer layer but also used as the collector itself.

The sealing plate 11 is a stainless steel-made substrate and fixed to the container main body 10 by welding which uses the seal ring 12 as described above. The welding employed at this time includes seam welding by which a roller electrode is brought into contact, laser beam welding and ultrasonic welding.

Further, in the sealing plate 11 of the present embodiment, a metal layer 21 is coated all over on the lower surface of the sealing plate facing toward the container main body 10 side, with the primer layer 20 held between the sealing plate 11 and the metal layer 21. Therefore, the primer layer 20 and the metal layer 21 are in contact not only with a negative electrode 27 to be described later but also with the seal ring 12.

The primer layer 20 is, for example, nickel and the metal layer 21 is, for example, gold. There is no particular restriction on a method for forming the primer layer 20 and the metal layer 21. They are preferably formed by electroless plating. It is also preferable that the primer layer 20 formed with, for example, nickel be about 5±4 μm in thickness and the metal layer 21 formed with gold be about 0.05 to 6 μm in thickness. The primer layer 20 and the metal layer 21 also function as a collector of the negative electrode 27 to be described later.

Here, the metal layer 21 is preferably 0.05 μm or more in thickness and more preferably 1 μm or more. Further, the metal layer 21 is preferably 6 μm or less in thickness. Thin plating may cause defects such as pin holes, and this plating is vulnerable to damage and not appropriate. Thick plating may cause cracks due to internal stress of plating after plating. And, corrosion may occur from these pin holes and cracks.

Further, where plating is carried out, electrolytic plating to which B (boron based compound) or P (phosphorus based compound) is not added is preferred to electroless plating to which B or P is added. This is because a material to which B (boron based compound) is added is higher in melting point than a pure nickel-plated material, thereby posing a difficulty in conducting seam welding or laser beam welding. And, a material to which P (phosphorus based compound) is added on electroless plating is lower in melting point than a pure nickel-plated material and easily welded by seam welding or laser beam welding. However, this material is lower in oxidation potential than the pure nickel-plated material and easily develops local galvanic corrosion. In particular, where electrolytic plating is carried out, continuous plating is preferred to barrel plating. This is because where electrolytic plating is carried out, variance in nickel deposition resulting from plating may be caused, and this variance may easily cause corrosion of the lid (sealing plate 11).

The metal layer 21 can be used also as a two-layer or a three-layer clad member.

Here, the sealing plate 11 can be formed by punching which uses a die punch, for example. The sealing plate 11 can also be obtained by machining by means of laser or by wire electric discharge machining, other than punching. Further, thin metal foil is preferably used because methods according to etching can be employed. Where laser machining or wire electric discharge machining is employed, an oxide layer is formed on a cut surface on machining, which needs electricity and power of the laser on sealing to cause cracks on a container, and this type of machining is not preferable. Therefore, it is preferable that etching be employed or an excessive oxide layer is removed after machining.

The electrochemical element 3 is provided with a positive electrode (first electrode) 25 which is fixed via the collector 14 on the bottom wall portion 10a of the container main body 10 and the negative electrode (second electrode) 27 which is stacked on the positive electrode 25, with a separator (separation member) 26 held between the positive electrode 25 and the negative electrode 27, and able to polarize a dissociative ion species (for example, TEMA-$BF_4$) contained in a liquid electrolyte W (electrolyte) filled inside the housing space S between the positive electrode 25 and the negative electrode 27.

Further, the electrochemical element 3 may be provided with a positive electrode (first electrode (for example, activated carbon)) 25 which is fixed via the collector 14 on the bottom wall portion 10a of the container main body 10 and a negative electrode (second electrode (for example, activated carbon)) 27 which is stacked on the positive electrode 25, with a separator (separation member) 26 held between them, and allows lithium ions (cation) to move between the positive electrode 25 and the negative electrode 27 via the liquid electrolyte (electrolyte) W filled inside the housing space S.

Still further, the electrochemical element 3 may have the ability to accumulate electric charge at least in one of the positive electrode 25 and the negative electrode 27 by absorbing (or doping) cation or anion such as lithium ions via the liquid electrolyte (electrolyte) W filled inside the housing space S.

The positive electrode 25 and the negative electrode 27 respectively have electrode active materials (a positive-electrode active material and a negative-electrode active material) which are involved in electrochemical reactions. At least one of the positive electrode 25 and the negative electrode 27 may be given as a metal oxide or the like which is capable of absorbing and releasing lithium ions via the liquid electrolyte W. Further, it is acceptable that for the purpose of increasing electron conductivity between electrode active materials, a conductivity assisting agent be added and a binding agent be also added for keeping the shape of the electrode, thereby configuring the positive electrode 25 and the negative electrode 27.

Of these electrodes 25, 27, the positive electrode 25 is fixed onto the collector 14 and conducted by using an electrically conductive adhesive agent, etc. (not illustrated). Thereby, the positive electrode 25 is conducted to the one external connecting terminal 15 via the collector 14 and the side electrode 17.

It is noted that an electrode is required to be in advance heated and dried in vacuum, in an oxygen-containing atmosphere (the atmosphere) or in a nitrogen atmosphere (reduction atmosphere) at temperatures from 200° C. or higher to 500° C. or lower. Where the sealing plate is jointed to the electrode by using an electrically conductive adhesive agent, the electrically conductive adhesive agent can be subjected to solidification reaction at the same time with drying of the electrode. Therefore, at a temperature of 120° C. or lower, solidification is insufficient and at a temperature of lower than 200° C., drying is insufficient. Further, where reflow treatment is given to a finished product, it is desirable to give prior heat treatment at a temperature equal to or higher than that of the reflow treatment. It is, thereby, possible to remove a material absorbed on the electrode and secure a stable quality. Further, where heating is given at a temperature higher than 500° C. in an oxygen-containing atmosphere on plating, a plated surface of the collector undergoes oxidation, which is not desirable. In particular, the sealing plate which is plated with Cu or its alloy is required to be heated under vacuum or in a nitrogen atmosphere. In this case, a finished product must be taken out at a temperature lower than 100° C. and, if possible, at a temperature lower than 50° C. Exposure of the finished product to an oxygen-containing atmosphere at a temperature exceeding 50° C. will cause oxidation of the surface, resulting in unstable quality of the finished product.

Then, the sheet-like separator 26 and the negative electrode 27 are stacked on the positive electrode 25 in this order. The negative electrode 27 is in contact with a lower surface of the sealing plate 11 via the primer layer 20 and the metal layer 21 and also conducted to the primer layer 20 and the metal layer 21. Thereby, the negative electrode 27 is conducted to the other external connecting terminal 16 via the primer layer 20, the metal layer 21, the seal ring 12, the joint layer 13 and the side electrode 18.

The separator 26 is a member which separates the positive electrode 25 from the negative electrode 27 to regulate direct contact between these electrodes 25, 27. The separator 26 is designed so as not to cause electric conduction resulting from contact between the both electrodes 25, 27 upon impact, etc. Further, the thickness of the separator 26 is given as an electrode distance between the positive electrode 25 and the negative electrode 27.

The liquid electrolyte W is a non-aqueous electrolyte (electrolyte solution) in which an aprotic polar organic solvent (for example, propylene carbonate and sulfolane), the moisture content of which is in advance reduced to 100 ppm or less, is dissolved in fluoroborate of quaternary ammonium (for example, TEMA-$BF_4$), the moisture content of which is also reduced, and may be present inside the housing space S in a state that at least the positive electrode 25, the negative electrode 27 and the separator 26 are submerged. Where a greater quantity of electrolyte solution is present, such a case is found that the container main body (base member) 10 may be damaged due to influences of cubical expansion of the electrolyte solution caused by heating on welding and elevation of steam pressure. Further, where the electrolyte solution is excessively adhered to the sealing plate (lid member) 11, the sealing plate (lid member) 11 undergoes electrochemical corrosion to decrease the performance of the capacitor or the like.

(Action of Electric Double-Layer Capacitor)

According to the above-configured electric double-layer capacitor 1, when voltage is applied between the positive electrode 25 and the negative electrode 27 via the pair of external connecting terminals 15, 16, for example, fluoroborate of quaternary ammonium undergoes ionization inside the liquid electrolyte W and adsorbs to the positive electrode 25 and the negative electrode 27 in a state of solvating the aprotic polar organic solvent to cause polarization. Thereby, an electric double layer is formed on the surface of activated carbon to accumulate electric charge. Then, charging and discharging occur.

The electric double-layer capacitor 1 of the present embodiment is preferably used in the following applications, for example.

Power source backup of memories and clock functions used in devices (for example, laptop personal computer, cellular phone, cordless phone, headphone stereo set, camcorder, digital camera, portable electric dictionary, desktop calculator, memory card, PDA and portable game machine)

Power source of sensors related to HEMS (home energy management system)

Battery element of electric power energy using EH (energy harvesting)

Battery element used in wireless sensor network, RFID (radio frequency identification) tag, RF (radio frequency) remote controller of digital home electric appliance, etc.

Power source and battery element of non-contact IC card and multifunctional IC card Backup power source of CPU and DRAM during temporary blackout Power source for saving data into flash memories Auxiliary power source of battery element biological power generator In particular, according to the electric double-layer capacitor 1 of the present embodiment, the sealing plate 11 welded on the container main body 10 via the seal ring 12 is formed with stainless steel covered with an oxide layer whose surface is dense and stable and, therefore, excels in corrosion resistance more than the sealing plate 11 formed with Kovar which has been conventionally and widely used as a material. Thus, the base metal of the sealing plate 11 is in a state of being protected by the oxide layer and the base metal containing nickel is less likely to flow out when welded on the container main body 10. Further, stainless steel is originally lower in nickel content than Kovar.

Therefore, an increase in leakage current on charging can be prevented to suppress a decrease in charging efficiency. It is, thereby, possible to provide an electric double-layer capacitor which is stable in quality for a prolonged period of time and highly reliable. In particular, an electric double-layer capacitor is provided which is excellent in cycle characteristics on charging and discharging.

Further, as described above, since the oxide layer formed on the surface of the sealing plate 11 is stable, the layer is less likely to peel off due to flaws, etc., and able to suppress exposure of the base metal of the sealing plate 11. In this regard as well, an increase in leakage current on charging can be suppressed, and the sealing plate 11 is easily handled, by which the electric double-layer capacitor 1 can be assembled with improved workability. Still further, since stainless steel is easily available and low in price, the electric double-layer capacitor 1 itself can be easily reduced in cost.

Further, in the present embodiment, the metal layer 21 is coated on the lower surface of the sealing plate 11 via the primer layer 20. Therefore, the base metal of the sealing plate 11 is protected not only by the oxide layer but also by the metal layer 21. As a result, the base metal is less likely to be exposed due to flaws, etc., and nickel contained in the base metal of the sealing plate 11 is further less likely to flow out when the sealing plate 11 is welded on the container main body 10. Thus, in this regard as well, an increase in leakage current on charging can be prevented to suppress a decrease in charging efficiency. Then, an electric double-layer capacitor is provided which is excellent in cycle characteristics on charging and discharging.

Since the metal layer 21 is formed on the primer layer 20, it is possible to coat the metal layer 21 on the sealing plate 11 stably and firmly. Further, on welding the sealing plate 11, nickel-plated on the seal ring 12, nickel on the primer layer 20 and gold on the metal layer 21 can be fused firmly, while they are melted to each other. Thereby, it is possible to firmly weld the sealing plate 11 on the container main body 10 via the seal ring 12, the primer layer 20 and the metal layer 21. As a result, the housing space S in which the electrochemical element 3 is housed is increased in sealing property, and the electric double-layer capacitor is easily made stable in quality.

In particular, as the primer layer 20, used is nickel which is the same as that plated on the seal ring 12. Therefore, the seal ring 12 can be reliably fused with the primer layer 20 quite favorably fitting with each other at high compatibility. Then, the sealing plate 11 can be firmly welded on the container main body 10.

The metal layer 21 made of gold is a metal which is less likely to undergo oxidation and, therefore, lower in ionization tendency than nickel and less likely to flow out on welding. Thus, nickel contained in the primer layer 20 and nickel contained in the base metal of the sealing plate 11 are less likely to flow out together with the metal layer 21. As a result, such a phenomenon that leakage current is increased on charging to decrease the charging efficiency is less likely to occur.

In the above-described embodiment, stainless steel as a material of the sealing plate 11 includes any type of stainless steel, for example, austenite/ferrite two-phase stainless steel such as SUS 329J4L; austenitic stainless steel such as SUS 301, SUS 302, SUS 304, SUS 316, SUS 316L, SUS 321, SUS 347, SUS 201, SUS 202; martensitic stainless steel such as SUS 403; ferritic stainless steel such as SUS 430, SUS 405; martensitic precipitation hardening stainless steel such as SUS 630, SUS 631; and precipitation hardening stainless steel such as SUS 15-7PH, SUS 17-7PH.

In particular, austenite/ferrite two-phase stainless steel and austenitic stainless steel are high in corrosion resistance and, therefore, preferable. Austenitic stainless steel such as SUS 201, SUS 202 high in Mn content and austenite/ferrite two-phase stainless steel are small in thermal expansion coefficient and, therefore, more preferable.

Further, the primer layer 20 and the metal layer 21 are formed all over on the lower surface of the sealing plate 11. In view of rust prevention and facilitation of formation, it is preferable that the primer layer 20 and the metal layer 21 be formed all over the surface of the sealing plate 11.

However, formation of the layers is to prevent nickel contained in the base metal of the sealing plate 11 from flowing out to cause deposition. Therefore, it is acceptable that the layers be formed at least at a part opposing the negative electrode 27 on the surface of the sealing plate 11. However, in order to improve the compatibility with the seal ring 12 on welding and obtain better fitting, as illustrated in the example, the primer layer 20 and the metal layer 21 are preferably formed also at a part in contact with the seal ring 12.

Further, in the above-described embodiment, the primer layer 20 and the metal layer 21 are formed on the sealing plate 11 but they are not essential. It is also acceptable that the sealing plate 11 on which neither the primer layer 20 nor the metal layer 21 is formed be directly welded on the container main body 10 via the seal ring 12. In this case as well, use of the stainless steel-made sealing plate 11 enables suppression of a decrease in charging efficiency due to an increase in leakage current on charging.

However, the metal layer 21 is preferably coated on the sealing plate 11. The metal layer 21 is coated more preferably, with the primer layer 20 held between the metal layer 21 and the sealing plate 11.

Further, in the above-described embodiment, as an example of the metal layer 21, gold (Au) is cited. However, the metal layer is not limited to gold but may be formed with a metal material selected from any one of metals such as tin (Sn), copper (Cu), silver (Ag), iridium (Ir), palladium (Pd) and rhodium (Rh) or may be formed with an alloy which contains at least one type of these metal materials.

In particular, where Cu, Ag, Ir, Pd and Rh are used, they are metals which are less likely to undergo oxidation than nickel, lower in ionization tendency and less likely to flow out, as with the use of Au. Thus, nickel contained in the base metal of the sealing plate 11 is less likely to flow out together with these metals. Meanwhile, where Sn is solely used, this metal is low in melting point and not suitable for the use in reflow treatment. Therefore, where Sn is used, it is desirable that Sn is used as a plating alloy with Co or Cu, etc.

As described so far, use of any of the above-described metal materials makes it possible to suppress a decrease in charging efficiency due to an increase in leakage current on charging.

Although nickel is used as the primer layer 20, where, for example, silver is used as the metal layer 21, it is preferable to use copper which is highly compatible and favorably fits with silver. However, where the surface of the seal ring 12 is plated with nickel, it is preferable to use nickel which is the same material as the primer layer 20 for better fitting on welding.

Further, in the above-described embodiment, the seal ring 12 is fixed to the joint layer 13. The joint layer 13 is not essential, and the seal ring 12 may be directly brazed on the peripheral wall portion 10b of the container main body 10. In this case, the side electrode 18 may be conducted to the seal ring 12.

Still further, in the above-described embodiment, as an example of the jointing material, the nickel-plated seal ring 12 is cited. However, plating may be carried out by using tin or gold, etc., other than nickel. And, a material of the seal ring 12 shall not be limited to Kovar.

However, a preferable material is that close in thermal expansion coefficient with respect to the container main body 10. For example, when aluminum oxide having a thermal expansion coefficient of $6.8 \times 10^{-6}/^\circ$ C. is used to form the container main body 10, Kovar having a thermal expansion coefficient of $5.2 \times 10^{-6}/^\circ$ C. or 42-alloy having a thermal expansion coefficient of 4.5 to $6.5 \times 10^{-6}/^\circ$ C. is preferably used to form the seal ring 12.

It is noted that the jointing material shall not be limited to the seal ring 12 and includes, for example, brazing filler metals such as gold, silver and silver/copper (Ag/Cu) and soldering materials, etc. In this case, the jointing material may be decided for its material, with fitting with the sealing plate 11, a reflow temperature, etc., taken into account. For example, where reflow is carried out at a temperature of about 260° C., there may be used a jointing material which fuses at a temperature higher than 260° C. and, therefore, a jointing material which fuses at about 300° C. may be used. However, the seal ring 12 is preferably used, with thermal influences on the container main body 10 on welding taken into account.

Further, in the above-described embodiment, a material of the container main body 10 includes, for example, ceramic and glass, etc. More specifically, a ceramic material includes, for example, aluminum oxide-made HTCC (high temperature co-fired ceramic) and glass ceramic-made LTCC (low temperature co-fired ceramic), etc.

Still further, a glass material includes, for example, soda lime glass, lead glass and borosilicate glass, etc. Borosilicate glass is preferable, with workability taken into account.

In addition, in the above-described embodiment, the collector 14 is conducted to the one external connecting terminal 15 via the side electrode 17, and the joint layer 13 is conducted to the other external connecting terminal 16 via the side electrode 18, to which the present invention shall not be, however, limited.

Figure 2:
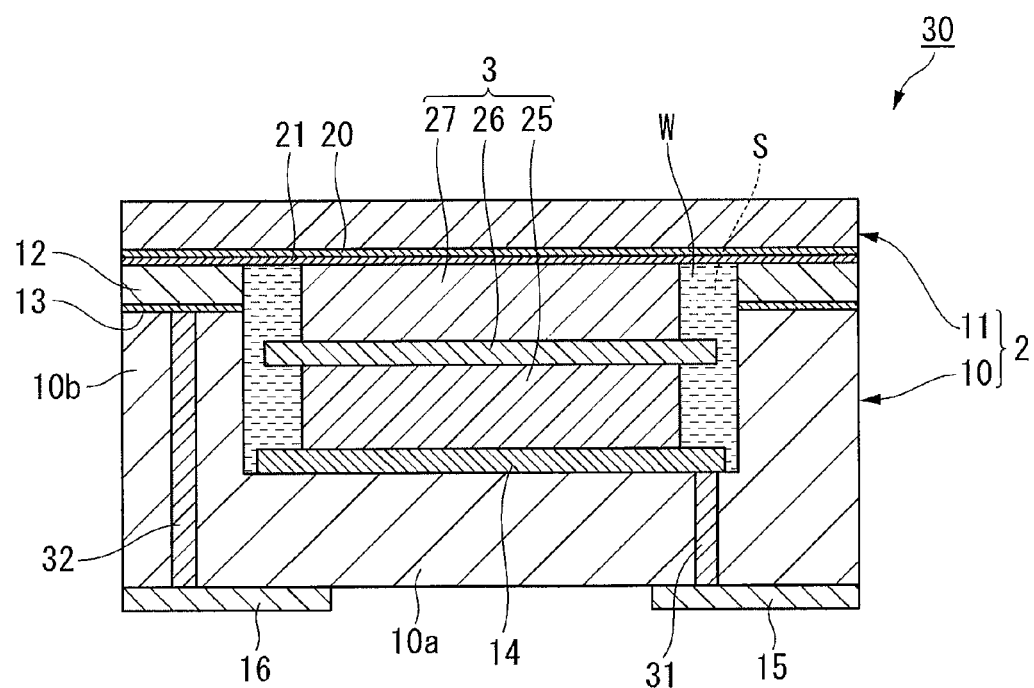
FIG. 2 is a longitudinal sectional view which shows a modified example of the electric double-layer capacitor.

For example, as shown in FIG. 2, it is also acceptable that the collector 14 be conducted to the one external connecting terminal 15 via a first through electrode 31 and the joint layer 13 is conducted to the other external connecting terminal 16 via a second through electrode 32. Hereinafter, this point will be described in detail.

The collector 14 in this case is formed on the bottom wall portion 10a of the container main body 10 inside the housing space S. Then, the first through electrode 31 is formed so as to vertically penetrate the bottom wall portion 10a of the container main body 10, by which the collector 14 is conducted to one external connecting terminal 15. Meanwhile, the second through electrode 32 is formed so as to vertically penetrate both the bottom wall portion 10a and the peripheral wall portion 10b of the container main body 10, by which the joint layer 13 is conducted to the other external connecting terminal 16.

Even a thus configured electric double-layer capacitor 30 is able to provide similar actions and effects, although being only different in a route connecting the pair of external connecting terminals 15, 16 with the collector 14 and the joint layer 13, and can be used as a surface-package type electric double-layer capacitor.

It is also acceptable that the through electrodes be used in combination with the side electrodes, by which the collector 14 is conducted to the one external connecting terminal 15 and the joint layer 13 is conducted to the other external connecting terminal 16.

Figure 3:
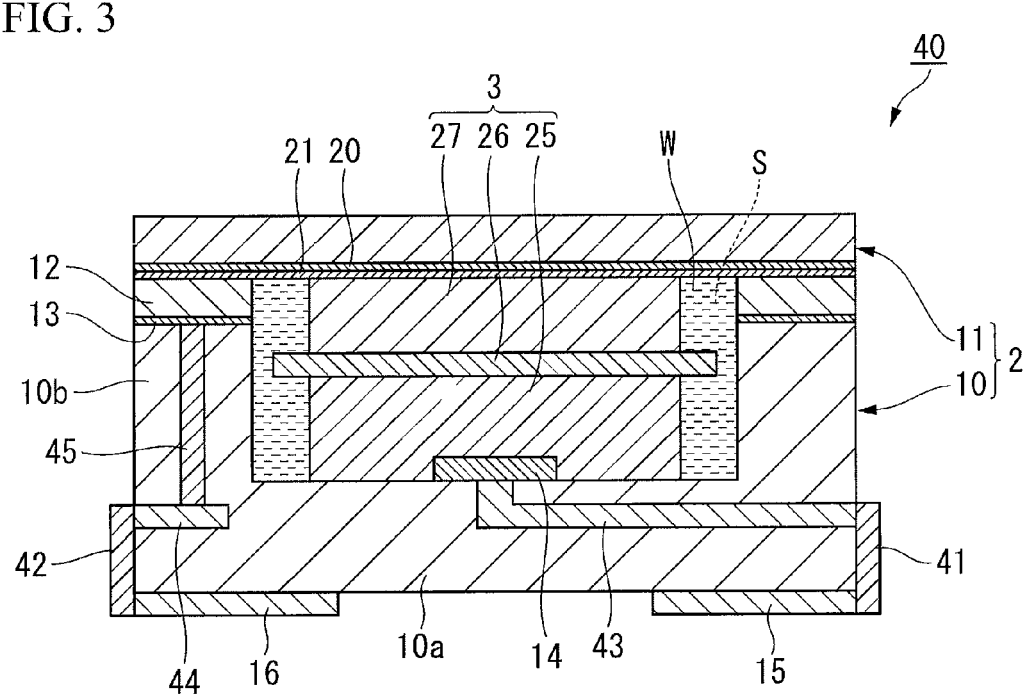
FIG. 3 is a longitudinal sectional view of another modified example of the electric double-layer capacitor.

For example, as shown in FIG. 3, the collector 14 smaller in lateral sectional area than the positive electrode 25 is formed substantially at the center of the positive electrode 25 on the bottom wall portion 10a of the container main body 10, the collector 14 is connected to one side electrode 41 with each other by using one internal electrode 43 formed inside the bottom wall portion 10a. Further, a through electrode 45 which is conducted to the joint layer 13 is formed midway to the bottom wall portion 10a, and the through electrode 45 is connected to the other side electrode 42 with each other by using the other internal electrode 44 formed inside the bottom wall portion 10a.

Due to the above-described configuration, the collector 14 can be conducted to the one external connecting terminal 15 via the one internal electrode 43 and the one side electrode 41. Further, the joint layer 13 can be conducted to the other external connecting terminal 16 via the through electrode 45, the other internal electrode 44 and the other side electrode 42.

Even the thus configured electric double-layer capacitor 40 is able to provide similar actions and effects, although being only different in a route which connects the pair of external connecting terminals 15, 16 with the collector 14 and the joint layer 13, and can be used as a surface-package type electric double-layer capacitor.

Further, in the above-described embodiment, the base member is given as the container main body 10 in the shape of a closed-end tube, and the lid member is given as the flat-plate-like sealing plate 11, to which the present invention shall not be, however, limited. As long as there can be defined the housing space S which is sealed between the base member and the lid member, the base member and the lid member may be formed in any shape.

Figure 4:
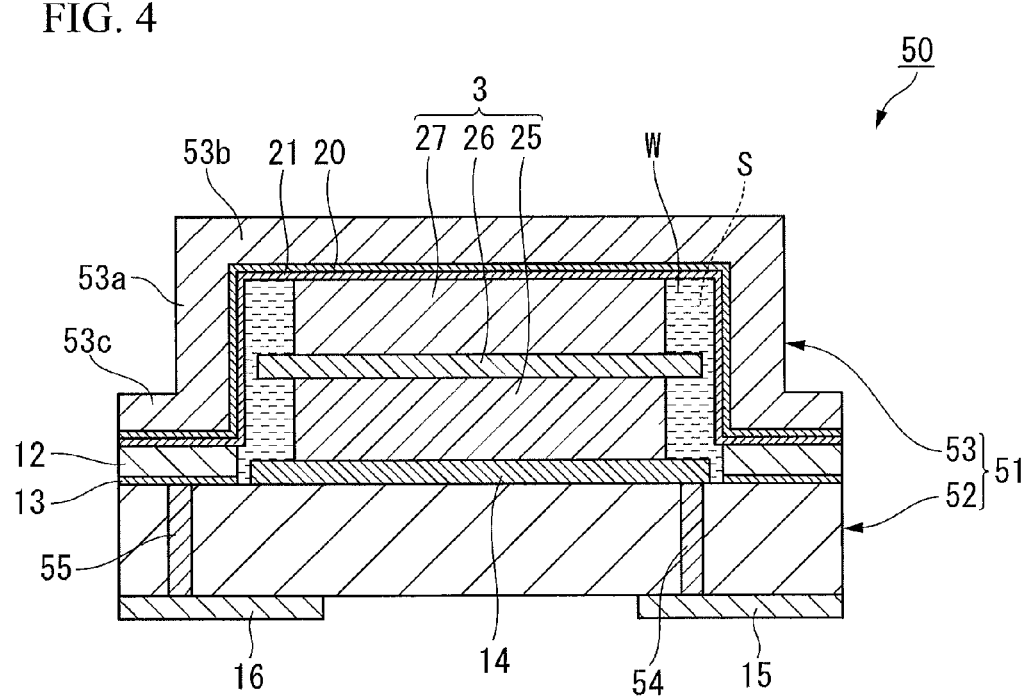
FIG. 4 is a longitudinal sectional view which shows still another modified example of the electric double-layer capacitor.

For example, as shown in FIG. 4, it is acceptable that a hermetic container 51 be such that the base member is given as a flat-plate-like base substrate 52 and the lid member is given as a ceiled cylindrical lid body 53.

The base substrate 52 is provided with, for example, a first through electrode 54 and a second through electrode 55, respectively. The collector 14 is conducted to the one external connecting terminal 15 by the first through electrode 54. The joint layer 13 is conducted to the other external connecting terminal 16 by the second through electrode 55.

The lid body 53 is provided with a cylindrical peripheral wall portion 53a, a top wall portion 53b which is installed consecutively at an upper end portion of the peripheral wall portion 53a and also blocks the peripheral wall portion 53a, and a flange portion 53c which is installed consecutively at a lower end portion of the peripheral wall portion 53a and also extends outside the peripheral wall portion 53a in a radial direction. The flange portion 53c is stacked on the base substrate 52 via the joint layer 13 and the seal ring 12.

Then, the lid body 53 is fixed onto the base substrate 52 by welding using the seal ring 12. In this case, a space which is defined by the peripheral wall portion 53a and the top wall portion 53b of the lid body 53 and the base substrate 52 is given as the housing space S. Further, the primer layer 20 and the metal layer 21 are formed on an inner surface of the lid body 53.

Even a thus configured electric double-layer capacitor 50 is able to provide similar actions and effects, although being only different in shape from the hermetic container, and can be used as a surface-package type electric double-layer capacitor.

It is noted that a technical scope of the present invention shall not be limited to the above-described embodiment and the present invention may be modified in various ways in a scope not departing from the gist of the present invention.

For example, in the above-described embodiment, a description has been given with reference to an electric double-layer capacitor as an example of the electrochemical cell, to which the present invention shall not be, however, limited.

The electrochemical cell is usable in an electrochemical device involved in oxidation/reduction reactions and includes, for example, a lithium ion capacitor which uses a material capable of absorbing and releasing metal lithium ions as a positive-electrode active material or a negative-electrode active material and a lithium ion rechargeable battery which uses an alloy of metal lithium with other metal, such as aluminum or tin.

In particular, the electrochemical cell may include a lithium ion capacitor which uses as the negative-electrode active material a carbon-based material or a silicon-based material capable of absorbing lithium ions to dope in advance the lithium ions into the material and a lithium ion rechargeable battery. The electrochemical cell is also applicable to a lithium ion capacitor in which at least one of the positive electrode and the negative electrode is used in combination with an electrode of activated carbon, etc., used in an electric double-layer capacitor or the like.

In the above-described embodiment, for example, individual materials of the positive electrode 25, the negative electrode 27 and the liquid electrolyte W may be freely selected as long as lithium ions can be moved or polarized between the positive electrode 25 and the negative electrode 27, and charging/discharging can be effected by exchange of electric charge due to absorption and release of the lithium ions.

It is acceptable that, for example, FeS be used as the positive electrode active material and SiO be used as the negative-electrode active material. It is also acceptable that a lithium-containing manganese oxide be used as the positive electrode active material and an intermetallic compound which is alloyed with metal lithium such as Li—Al alloy is used as the negative-electrode active material.

Intermetallic compounds of lithium include, for example, Li—In alloy, Li—Sn alloy and Li—Si alloy other than Li—Al. A third additive may be added to these intermetallic compounds other than the above-described elements for the purpose of improving the strength of the material, etc. The third additive includes, for example, elements such as Ca, Mg, Si, Mn and V.

The stainless steel-made lid member of the present invention is used as a lid material, thus making it possible to use even a conventional electrode active material which contains sulfur or the like which easily reacts with metal nickel, etc., and an electrolyte (such as solvent, supporting electrolyte and solid electrolyte) as an electrochemical cell. Therefore, the scope of application will be drastically broadened, and a great contribution in the development of industries can be expected.

Further, the above-described embodiment is configured in such a manner that the liquid electrolyte W is filled into the housing space S to submerge the negative electrode 27, the positive electrode 25 and the separator 26. However, they are not necessarily hermetically submerged into the housing space S, and an electrolyte solution may be impregnated into the separator 26 so as to form a liquid junction at least between the negative electrode 27 and the positive electrode 25. Even in this case, the liquid electrolyte W is allowed to reliably exist on a boundary surface between the separator 26 and the positive electrode 25 and a boundary surface between the separator 26 and the negative electrode 27, thereby effecting electrochemical reactions.

The electrolyte shall not be limited to the liquid electrolyte W but may include a solid electrolyte.

In this case, an inorganic solid electrolyte ($Li_2S$, $SiS_2$, $Li_4SiO_4$) is kneaded into ceramic paper which is a sintered body obtained by sintering, for example, fiber bodies of aluminum oxide and titania or hot pressing is carried out to form an electrode integrally with the solid electrolyte, which can then be used as a separation member in place of the separator 26.

Further, it is acceptable that as a method for forming an electrode integrally with a solid electrolyte, the solid electrolyte be arranged between the positive electrode 25 and the negative electrode 27 so as to be stacked and a physical technique such as a spark plasma sintering (SPS) method (electrification sintering=plasma sintering) be employed to form the electrode integrally with the solid electrolyte. It is also acceptable that the solid electrolyte be deposited on the surface of the positive electrode 25 or the negative electrode 27 by employing a physical technique such as laser abrasion deposition method, radio frequency (RF) sputtering method and vacuum deposition, thereafter, the solid electrolyte be held between the positive electrode 25 and the negative electrode 27, stacked on each other and, then, they are formed integrally by contact bonding for subsequent use.

In this case as well, for example, lithium ions are allowed to move between the positive electrode 25 and the negative electrode 27 through the solid electrolyte, by which electrochemical reactions can be carried out reliably. The above-described configuration can be used as an electrochemical cell.

In particular, in this case, there is eliminated a necessity for using a liquid electrolyte, by which assembly property is improved to improve the productivity. Further, there is no concern that the liquid electrolyte will evaporate on reflow and reflow work can be carried out more efficiently.

It is also acceptable that where a solid electrolyte sheet is used as the separation member, the solid electrolyte sheet, the positive electrode 25 and the negative electrode 27 be stacked on each other and combined integrally in advance. Thereby, the positive electrode 25, the negative electrode 27 and the solid electrolyte sheet can be handled as one unit. It is, thus, possible to conduct assembly work more easily and further improve the productivity.

(Method for Welding Sealing Plate)

Here, in fabricating the electric double-layer capacitor 1 shown in FIG. 1, a detailed description will be given of a method for welding the sealing plate 11.

Figure 5:
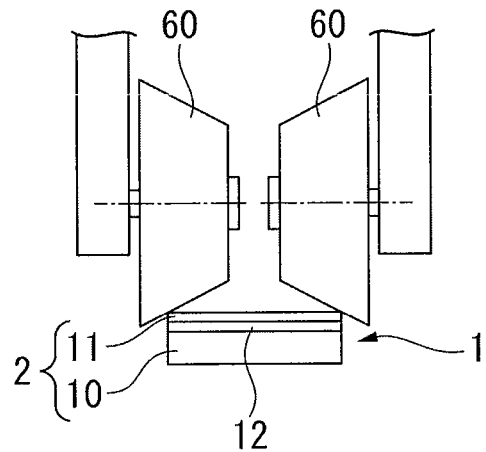
FIG. 5 is a drawing which shows one step of manufacturing the electric double-layer capacitor given in FIG. 1 and a side view which shows a state that a sealing plate is welded by seam welding which uses a roller electrode.
Figure 6:
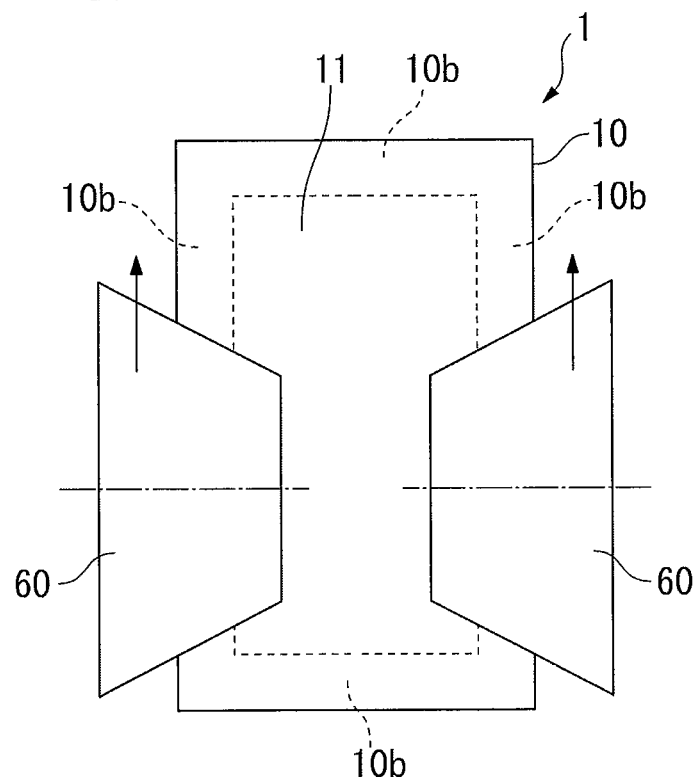
FIG. 6 is a plan view which shows a state given in FIG. 5 when viewed from above and in which the roller electrode is allowed to proceed along peripheral wall portions which are long sides thereof.

In this case, as described previously, it is preferable that welding be carried out by seam welding using a roller electrode. More specifically, as shown in FIG. 5 and FIG. 6, while roller electrodes 60 are allowed to proceed, for example, along the pair of peripheral wall portions 10b which are long sides of the peripheral wall portion 10b of the container main body 10 (in a direction indicated by arrows in FIG. 6), pressure is applied to the sealing plate 11 stacked on the seal ring 12, and electricity is also supplied intermittently, thereby carrying out resistance welding.

The above-described welding method is not limited to seam welding and may include, for example, laser beam welding.

Figure 7:
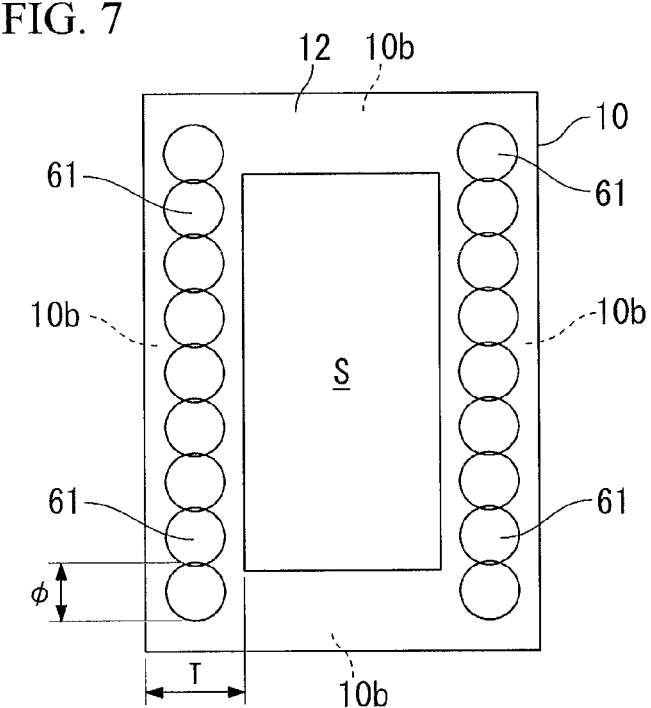
FIG. 7 is a plan view which shows a state in which the sealing plate is removed in the state given in FIG. 6.

Accordingly, as shown in FIG. 7, welded parts 61 in which the metal layer 21 formed on the lower surface of the sealing plate 11 is melted and fused with a plated part of the seal ring 12 can be formed so as to be overlapped continuously on a boundary surface between the sealing plate 11 and the seal ring 12 along the pair of peripheral wall portions 10b which are long sides. Thereby, the sealing plate 11 is completely welded along the pair of peripheral wall portions 10b which are long sides.

It is noted that FIG. 7 is a plan view which shows a state that the sealing plate 11 is removed.

Of the roller electrodes 60, one roller electrode is given as a positive electrode and the other roller electrode is given as a negative electrode, and a power source (not illustrated) supplies a predetermined welding voltage between them. In this case, the welded parts 61 vary in welded diameter φ in proportion to a quantity of supplied electric current. That is, heating value is increased with an increase in quantity of electric current to enlarge the welded diameter φ.

Figure 8:
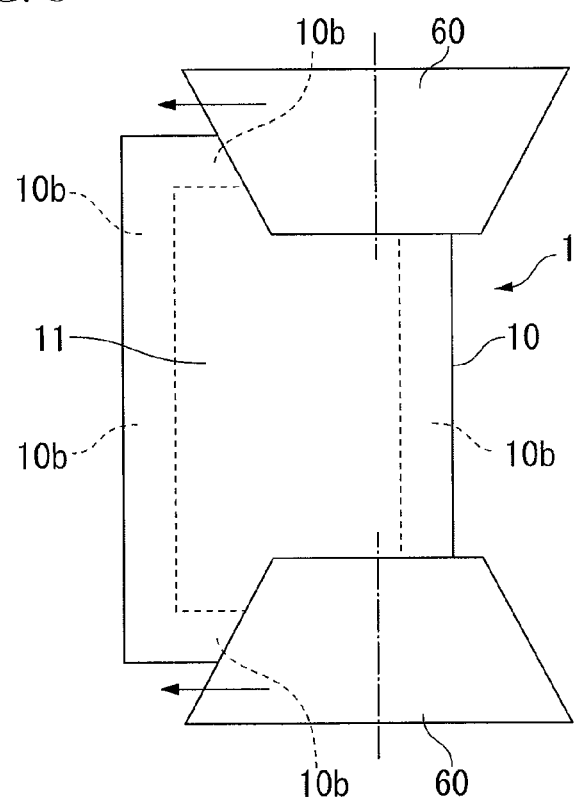
FIG. 8 is a drawing in which the roller electrode is allowed to proceed along peripheral wall portions which are short sides thereof after the state given in FIG. 6.
Figure 9:
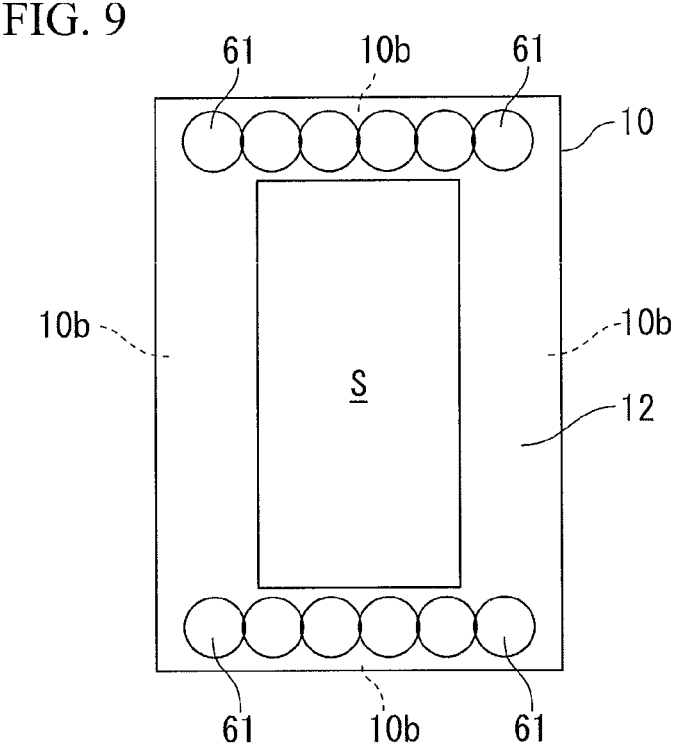
FIG. 9 is a plan view which shows a state that the sealing plate is removed in a state given in FIG. 8.

Next, as shown in FIG. 8, the roller electrodes 60 are allowed to proceed along the pair of peripheral wall portions 10b which are short sides of the peripheral wall portion 10b of the container main body 10 (a direction indicated by an arrow) and welding is carried out similarly. Thereby, as shown in FIG. 9, the welded parts 61 can be formed so as to be continuously overlapped on a boundary surface between the sealing plate 11 and the seal ring 12 along the pair of peripheral wall portions 10b which are short sides. Then, the sealing plate 11 is completely welded along the pair of peripheral wall portions 10b which are short sides.

It is noted that FIG. 9 is a plan view which shows a state that the sealing plate 11 is removed.

As a result, the sealing plate 11 can be welded to provide the electric double-layer capacitor 1 shown in FIG. 1. The pair of peripheral wall portions 10b side which are long sides of the peripheral wall portions 10b of the container main body 10 are first welded, to which the present invention shall not be, however, limited. It is acceptable that the pair of peripheral wall portions 10b side which are short sides be first welded.

Meanwhile, when the above-described seam welding is carried out, the sealing plate 11 is preferably increased in thickness. More specifically, the thickness of 30 μm or less is preferable. In this regard, a description will be given as follows.

On welding, heat from the roller electrode 60 is transferred to the sealing plate 11 with which the roller electrode 60 is in contact. However, heat is also transferred not only to the sealing plate 11 but also to the seal ring 12. Therefore, both the sealing plate 11 and the seal ring 12 undergo thermal expansion and also undergo thermal contraction by cooling after completion of welding. At this time, the sealing plate 11 and the seal ring 12 are different in thermal contraction coefficient and stress acts between them. Then, stress will easily act in a concentrated manner on the peripheral wall portion 10b of the container main body 10 which is connected to the seal ring 12 and thin in wall thickness. Thus, there is a possibility that the peripheral wall portion 10b may have defects such as cracks and undesirable deformation.

Therefore, in order to suppress occurrence of such defects, it is preferable that the sealing plate 11 be made thin, that is, 30 μm or less in thickness, thereby suppressing an influence of thermal contraction on the sealing plate 11. It is, thereby, possible to suppress an incidence rate of cracks to 1% or less.

There may be a case that heat on seam welding is transferred to the seal ring 12 and also to the peripheral wall portion 10b of the container main body 10 simultaneously via the non-aqueous electrolyte solution W, for example. In this case, there is a great difference in temperature between the peripheral wall portion 10b and the bottom wall portion 10a in the container main body 10. There is a possibility that the stress concentrates on the bottom wall portion 10a on cooling and cracks, undesirable deformation, etc., occur at the bottom wall portion 10a. In addition, there is also a possibility that the non-aqueous electrolyte solution W evaporates to deteriorate the performance.

Therefore, in view of suppressing the above-described defects as well, it is preferable that the sealing plate 11 be 30 μm or less in thickness.

Further, in order to effectively suppress occurrence of the defects, it is preferable that the peripheral wall portion 10b be increased in wall thickness T (refer to FIG. 7) and the welded part 61 be decreased in welded diameter φ.

Where the wall thickness T is thin, the peripheral wall portion 10b is decreased in strength (stiffness) to easily cause cracks, undesirable deformation, etc. Further, where the welded diameter y is large, a quantity of electric current on welding is increased to cause excessive transfer of heat. Thus, cracks, undesirable deformation, etc., will occur easily.

Therefore, more specifically, it is preferable that a relationship between the wall thickness T (μm) of the peripheral wall portion 10b and the welded diameter φ (μm) of the welded part 61 be given so as to satisfy the following formula (1).

$$\frac{\text{Welded diameter } \varphi}{\text{Wall thickness } T} < 0.5 \quad (1)$$

It is, thereby, possible to suppress an incidence rate of cracks to 1% or less.

Figure 10:
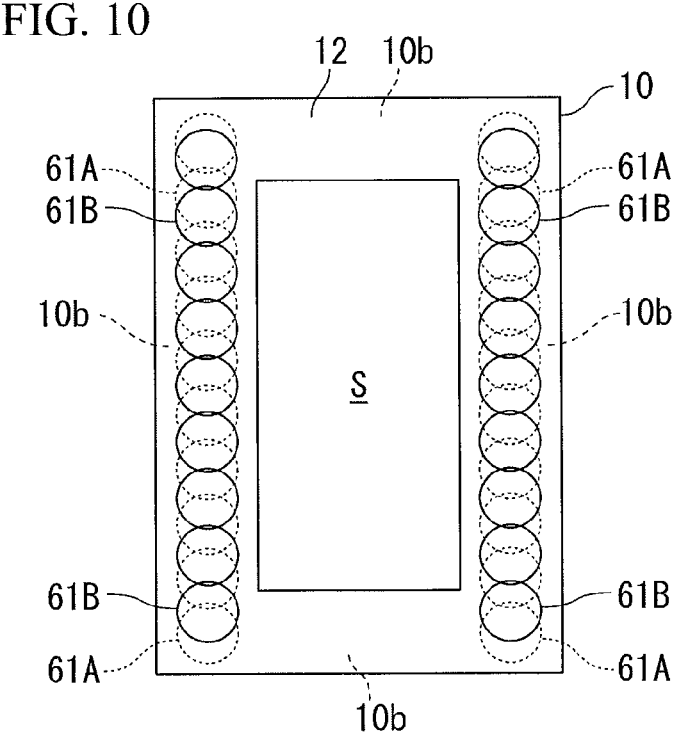
FIG. 10 is a drawing corresponding to FIG. 7 or a drawing which shows a case where welding is repeated two times.

Further, where the above formula (1) is satisfied, it is preferable to repeat welding several times. Thereby, as shown in FIG. 10, of the peripheral wall portions 10b of the container main body 10, for example, when the pair of peripheral wall portions 10b which are long sides are welded, welded parts 61A on first welding can be overlapped continuously on welded parts 61B on second welding. It is, thereby, possible to hermetically seal the housing space S more reliably.

Figure 11:
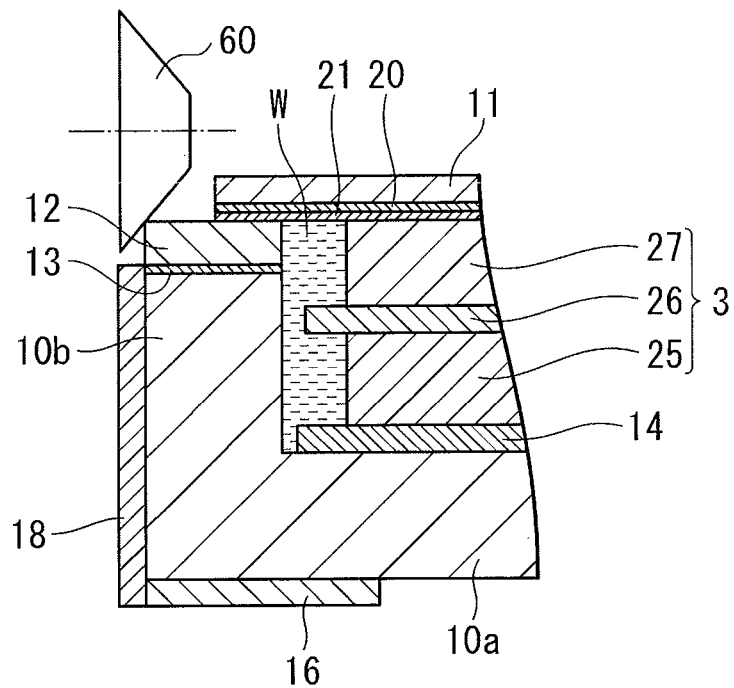
FIG. 11 is a sectional view which shows that the sealing plate is welded by seam welding which uses the roller electrode or a drawing in which external dimension of the sealing plate is smaller than external dimension of the seal ring.

FIG. 10 is a plan view which shows a state that the sealing plate 11 is removed. Further, since the above formula (1) is satisfied, an incidence rate of cracks is less likely to increase even if welding is repeated several times.

Where the above-described seam welding is carried out, in order to prevent defects such as cracks and undesirable deformation as described above, the sealing plate 11 is preferably increased in thickness. However, in this case, as shown in FIG. 11, if the sealing plate 11 is smaller in external dimension than the seal ring 12, there is a possibility that the roller electrode 60 is not in contact with the sealing plate 11 to cause poor welding.

Figure 12:
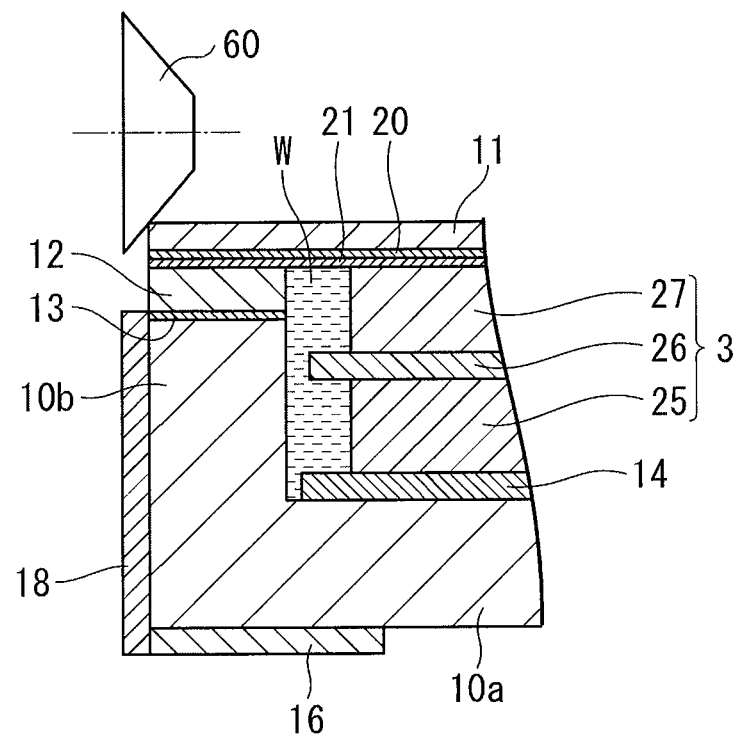
FIG. 12 is a sectional view which shows that the sealing plate is welded by seam welding which uses the roller electrode or a drawing in which the external dimension of the sealing plate is equal to the external dimension of the seal ring.

Therefore, as shown in FIG. 12, it is preferable that the sealing plate 11 be determined for its external dimension so that an outer peripheral part of the sealing plate 11 is in alignment with an outer peripheral part of the seal ring 12. Thereby, the roller electrode 60 can be used to reliably supply electricity to the sealing plate 11 and welding can be carried out favorably.

It is also preferable that the seal ring 12 be made greater in thickness than the sealing plate 11. In particular, in order to prevent the above-described defects such as cracks and undesirable deformation, the sealing plate 11 is preferably decreased in thickness. At this time, the seal ring 12 is made greater in thickness than the sealing plate 11. It is, thereby, possible to suppress thermal expansion of the seal ring 12 as much as possible and also prevent heat transfer to the peripheral wall portion 10b.

For example, where the sealing plate 11 is made about 20 μm in thickness, it is preferable that the seal ring 12 be made about 30 to 40 μm in thickness. A preferred maximum thickness of the seal ring 12 is substantially half the entire thickness of the electric double-layer capacitor 1.

EXAMPLES

Hereinafter, a description will be given of examples carried out for confirming the validity of the present invention. More specifically, a sealing plate was welded on a container main body via a nickel-plated seal ring to fabricate an electrochemical cell in which an electrochemical element was sealed inside a housing space, the electrochemical cell was repeatedly charged and discharged, during which a first evaluation test was carried out to confirm whether the electrochemical cell was charged and discharged stably or not.

Further, a second evaluation test was carried out to confirm whether cracks occurred on the electrochemical cell or not when the sealing plate was welded and cooled thereafter in fabricating the electrochemical cell.

In the first evaluation test, a plurality of patterns were tested by changing a material of the sealing plate, presence or absence of plating, and types of plating. The results are shown in Table 1 to Table 4.

In the second evaluation test, a plurality of patterns were tested by changing a material of the sealing plate and the thickness thereof. The results are shown in Table 5 to Table 8.

First, a description will be given of the first evaluation test.

Charging and discharging were carried out at a constant current (CC) and constant voltage (CV). More specifically, charging was first started at a constant current and at a point of time when a maximum voltage (3.3 V) was reached, the voltage was retained for a certain period of time. In this case, total time of charging time and retention time was set to be two hours. Next, after two hours have passed, discharging was started at a constant current and at a point of time when a minimum voltage (0 V) was reached, the voltage was retained for a certain period of time. In this case as well, total time of discharging time and retention time was set to be two hours.

The above-described one-time charging and the one-time discharging were combined to give one cycle, which was repeated 120 cycles.

A temperature condition of the electrochemical cell on charging and discharging was set at a predetermined temperature free of decomposition of a liquid electrolyte, more specifically, at 70±3° C. The temperature was changed to a room temperature (25±3° C.) whenever necessary during repetition of the above cycle.

Then, under the above-described conditions, charging and discharging were carried out in 120 cycles, during which change in capacity (electric capacity (μAh) used on charging) was monitored. Thereby, evaluation was made for stability of cycle characteristics on charging and discharging.

More specifically, where leakage current due to decomposition of an electrolyte solution and nickel which flowed out on charging and discharging was increased by 100% or more (a state in which an electric current value was doubled), charging was abnormal and the above capacity was changed rapidly and significantly.

Therefore, where the capacity was significantly changed, determination was made that an increase in leakage current was "found" (decrease in charging efficiency). In contrast, where there was no significant change in capacity and the capacity was changed smoothly, determination was made that an increase in leakage current was "not found" (the charging efficiency was not decreased and cycle characteristics on charging and discharging were stable).

(First Evaluation Test)

First, an evaluation test was made for a case where a stainless steel-made sealing plate was used and a case where a nickel-plated Kovar-made sealing plate was used. The results are shown in Table 1.

In Table 1, Test Examples 1 to 12 were evaluated under the former conditions and these are examples according to the present invention. In contrast, Test Example 13 was evaluated under the latter conditions and it is a comparative example of these examples. The sealing plate was equal in thickness in all Test Examples 1 to 13.

TABLE 1

Increase in leakage current (Found when increased by 100% or more)

| | Material of sealing plate | Presence or absence of plating | Thickness of gold plating (μm) | Test results | | |
|---|---|---|---|---|---|---|
| | | | | 40 cycles | 80 cycles | 120 cycles |
| Test Example 1 | SUS316 | Not found | | Not found | Not found | Found | Found |
| Test Example 2 | SUS304 | Not found | | Not found | Not found | Found | Found |
| Test Example 3 | NAS64 | Not found | | Not found | Not found | Not found | Found |
| Test Example 4 | SUS301 | Not found | | Not found | Not found | Found | Found |
| Test Example 5 | SUS316L | Not found | | Not found | Not found | Found | Found |
| Test Example 6 | SUS430 | Not found | | Not found | Not found | Found | Found |
| Test Example 7 | SUS631 | Not found | | Not found | Not found | Found | Found |
| Test Example 8 | SUS302 | Not found | | Not found | Not found | Found | Found |
| Test Example 9 | SUS321 | Not found | | Not found | Not found | Found | Found |

TABLE 1-continued

Increase in leakage current (Found when increased by 100% or more)

| | Material of sealing plate | Presence or absence of plating | Thickness of gold plating (μm) | Test results | | |
|---|---|---|---|---|---|---|
| | | | | 40 cycles | 80 cycles | 120 cycles |
| Test Example 10 | SUS347 | Not found | Not found | Not found | Found | Found |
| Test Example 11 | SUS15-7PH | Not found | Not found | Not found | Found | Found |
| Test Example 12 | SUS17-7PH | Not found | Not found | Not found | Found | Found |
| Test Example 13 | Kovar | NI | Not found | Found | Found | Found |

As is apparent from Table 1, where the Kovar-made sealing plate was used, there was found an increase in leakage current (abnormal charging) resulting from decomposition of an electrolyte solution, etc., in the course of reaching 40 cycles. However, where the stainless steel-made sealing plate was used, there was found no increase in leakage current after 40 cycles and there was found an increase in leakage current in the course of reaching 80 cycles or 120 cycles.

These results confirmed that the sealing plate was made of stainless steel, thus making it possible to suppress a decrease in charging efficiency and improve cycle characteristics on charging and discharging.

(Second Evaluation Test)

Next, an evaluation test was made for a case where a sealing plate was used in which stainless steel was gold-plated as a metal layer and a case where a nickel-plated Kovar-made sealing plate was used. The results are shown in Table 2.

In Table 2, Test Examples 14 to 27 were evaluated under the former conditions and these are examples according to the present invention. In contrast, Test Example 28 was evaluated under the latter conditions and it is a comparative example of these examples.

The sealing plate 11 was equal in thickness in all Test Examples 14 to 28. Each of Test Examples 14 and 15 was plated with gold having the respective layer thickness shown in Table 2 by vacuum deposition. Test Examples 16 to 27 were individually plated with gold having the respective layer thickness shown in Table 2 by an electroplating wet method.

TABLE 2

Increase in leakage current (Found when increased by 100% or more)

| | Material of sealing plate | Presence or absence of gold plating | Thickness of gold plating (μm) | Test results | | |
|---|---|---|---|---|---|---|
| | | | | 40 cycles | 80 cycles | 120 cycles |
| Test Example 14 | SUS316 | Found (deposition) | 0.18 | Not found | Not found | Found |
| Test Example 15 | SUS316 | Found (deposition) | 0.09 | Not found | Not found | Found |
| Test Example 16 | SUS316 | Found (wet method) | 0.24 | Not found | — | — |
| Test Example 17 | SUS316 | Found (wet method) | 0.08 | Not found | Not found | Found |
| Test Example 18 | SUS304 | Found (wet method) | 0.09 | Not found | Not found | Found |
| Test Example 19 | SUS301 | Found (wet method) | 0.10 | Not found | Not found | Found |
| Test Example 20 | SUS316L | Found (wet method) | 0.07 | Not found | Not found | Found |
| Test Example 21 | SUS430 | Found (wet method) | 0.06 | Not found | Not found | Found |
| Test Example 22 | SUS631 | Found (wet method) | 0.08 | Not found | Not found | Found |
| Test Example 23 | SUS302 | Found (wet method) | 0.09 | Not found | Not found | Found |
| Test Example 24 | SUS321 | Found (wet method) | 0.08 | Not found | Not found | Found |
| Test Example 25 | SUS347 | Found (wet method) | 0.09 | Not found | Not found | Found |
| Test Example 26 | SUS15-7PH | Found (wet method) | 0.10 | Not found | Not found | Found |
| Test Example 27 | SUS17-7PH | Found (wet method) | 0.11 | Not found | Not found | Found |
| Test Example 28 | Kovar | Not found | — | Found | Found | Found |

As is apparent from Table 2, where the Kovar-made sealing plate was used, there was found an increase in leakage current in the course of reaching 40 cycles. However, where the gold-plated stainless steel-made sealing plate was used, there was found no increase in leakage current after 40 cycles. Particularly, in Test Examples 14, 15, and 17 to 27, there was found no increase in leakage current even after 80 cycles.

The above-described results confirmed that use of the gold-plated stainless steel-made sealing plate made it possible to suppress a decrease in charging efficiency and improve cycle characteristics on charging and discharging.

In addition, when consideration was given to the results of Test Example 1 shown in Table 1 and the results of Test Examples 14 and 15 in Table 2, it was found that an increase in leakage current was less likely to occur when a gold-plated metal layer was coated on the surface of stainless steel than when stainless steel was used solely. That is, it was possible to further suppress a decrease in charging efficiency.

(Third Evaluation Test)

Next, an evaluation test was made for a case where used was a sealing plate in which stainless steel was plated with nickel as a primer layer and, thereafter, the nickel-plated stainless steel was plated with gold or a gold alloy as a metal layer and a case where a nickel-plated Kovar-made sealing plate was used. The results are shown in Table 3.

In Table 3, Test Examples 29 to 34 were evaluated under the former conditions and these are examples according to the present invention. In contrast, Test Example 35 was evaluated under the latter conditions and it is a comparative example of these examples.

In Test Example 29, austenitic stainless steel of SUS 316 was plated with pure gold (0.08 μm) as a metal layer by a wet method. In Test Example 30, austenitic stainless steel of SUS 316 was plated with pure gold (0.24 μm) as a metal layer by a wet method. In Test Example 31, austenitic stainless steel of SUS 316 was plated with pure gold (0.43 μm) as a metal layer by a wet method. In Test Example 32, austenitic stainless steel of SUS 316 was plated with pure gold (0.68 μm) as a metal layer by a wet method. In Test Example 33, austenitic stainless steel of SUS 316 was plated with a gold-cobalt alloy (0.19 μm) as a metal layer by a wet method. In Test Example 34, austenitic stainless steel of SUS 316 was plated with a gold-cobalt alloy (0.51 μm) as a metal layer by a wet method.

As is apparent from Table 3, where the Kovar-made sealing plate was used, there was found an increase in leakage current in the course of reaching 40 cycles. However, where there was used the stainless steel-made sealing plate which was coated with a primer layer plated with nickel and a metal layer plated with gold or its alloy, there was found no increase in leakage current after 40 cycles.

In particular, the number of cycles free of an increase in leakage current was increased with an increase in thickness of the metal layer. That is, it was possible to suppress a decrease in charging efficiency more greatly with an increase in thickness of the metal layer. In particular, in Test Examples 32 and 34, there was found no increase in leakage current even after 120 cycles and a decrease in charging efficiency was suppressed more effectively.

Use of the gold-cobalt alloy in place of pure gold as the metal layer resulted in improved assembling workability of an electrochemical cell. That is, it was found that pure gold which was soft was increased in hardness by the use of the gold-cobalt alloy in place of pure gold. Thus, when the metal layer was formed by a wet method, flaws, etc., were less likely to occur on the metal layer. Therefore, the electrochemical cell can be handled more easily than when pure gold is used. And, it is thought that assembling workability can be improved to raise a yield.

(Fourth Evaluation Test)

Next, an evaluation test was made for a case where used was a sealing plate in which stainless steel was plated with nickel as a primer layer and, thereafter, the nickel-plated stainless steel was plated with a metal material other than gold and a case where a nickel-plated Kovar-made sealing plate was used. The results are shown in Table 4.

In Table 4, Test Examples 36 to 41 were evaluated under the former conditions and these are examples according to the present invention. In contrast, Test Example 42 was evaluated under the latter conditions and it is a comparative example of these examples.

In Test Example 36, austenitic stainless steel of SUS 316 was plated with silver (Ag) (5 μm) as a metal layer by a wet method. In Test Example 37, austenitic stainless steel of SUS 316 was plated with copper (Cu) (5 μm) as a metal layer by a wet method. In Test Example 38, austenitic stainless steel of SUS 316 was plated with tin-copper (Sn—Cu) (5 μm) as a

TABLE 3

Increase in leakage current (Found when increased by 100% or more)

| | Material of sealing plate | Material of plating | Thickness of plating (μm) | Test results | | |
|---|---|---|---|---|---|---|
| | | | | 40 cycles | 80 cycles | 120 cycles |
| Test Example 29 | SUS316 | Pure gold | 0.08 | Not found | Found | Found |
| Test Example 30 | SUS316 | Pure gold | 0.24 | Not found | Found | Found |
| Test Example 31 | SUS316 | Pure gold | 0.43 | Not found | Not found | Found |
| Test Example 32 | SUS316 | Pure gold | 0.68 | Not found | Not found | Not found |
| Test Example 33 | SUS316 | Au—Co alloy | 0.19 | Not found | Found | Found |
| Test Example 34 | SUS316 | Au—Co alloy | 0.51 | Not found | Not found | Not found |
| Test Example 35 | Kovar | NI | 5 | Found | Found | Found | metal layer by a wet method. In Test Example 39, austenitic stainless steel of SUS 316 was plated with iridium (Ir) (5 μm) as a metal layer by a wet method. In Test Example 40, austenitic stainless steel of SUS 316 was plated with palladium (Pd) (5 μm) as a metal layer by a wet method. In Test Example 41, austenitic stainless steel of SUS 316 was plated with rhodium (Rh) (5 μm) as a metal layer by a wet method.

TABLE 4

Increase in leakage current (Found when increased by 100% or more)

| | Material of sealing plate | Material of plating | Thickness of plating (μm) | Test results 40 cycles | 80 cycles | 120 cycles |
|---|---|---|---|---|---|---|
| Test Example 36 | SUS316 | Ag | 5 | Not found | Not found | Found |
| Test Example 37 | SUS316 | Cu | 5 | Not found | Not found | Not found |
| Test Example 38 | SUS316 | Sn—Cu | 5 | Not found | — | — |
| Test Example 39 | SUS316 | Ir | 5 | Not found | — | — |
| Test Example 40 | SUS316 | Pd | 5 | Not found | — | — |
| Test Example 41 | SUS316 | Rh | 5 | Not found | — | — |
| Test Example 42 | Kovar | NI | 5 | Found | Found | Found |

As is apparent from Table 4, where the Kovar-made sealing plate was used, there was found an increase in leakage current in the course of reaching 40 cycles. However, where there was used the stainless steel-made sealing plate which was plated with nickel as a primer layer and plated with silver, copper, tin, iridium, palladium, or rhodium as a metal layer, there was found no increase in leakage current after 40 cycles. Therefore, it was possible to suppress a decrease in charging efficiency even where the above-described various types of the metal layer were used.

Next, a description will be given of the second evaluation test.

A plating-free stainless steel-made sealing plate was stacked on a seal ring and a roller electrode was brought into contact therewith to carry out seam welding, thereafter the sealing plate was cooled. A binocular stereoscopic microscope with magnification of about 20 times was used to confirm occurrence of cracks on an electrochemical cell by observing an appearance thereof. At this time, a plurality of electrochemical cells were macroscopically examined to calculate an incidence rate of cracks.

(Fifth Evaluation Test)

An evaluation test was made for stainless steel-made sealing plates, each of which was changed in material and thickness. The results are shown in Table 5.

In Test Examples 43 to 46, stainless steel of SUS 304 was used and thickness was respectively changed. In Test Examples 47 to 56, there was used stainless steel respectively different in material and thickness.

TABLE 5

| | Material of sealing plate | Thickness of sealing plate | Incidence rate of cracks |
|---|---|---|---|
| Test Example 43 | SUS304 | 8 μm | 0.4% |
| Test Example 44 | SUS304 | 20 μm | 0.5% |
| Test Example 45 | SUS304 | 40 μm | 2.6% |
| Test Example 46 | SUS304 | 100 μm | 4.2% |
| Test Example 47 | SUS301 | 10 μm | 0.5% |
| Test Example 48 | SUS316 | 10 μm | 0.5% |
| Test Example 49 | SUS316L | 20 μm | 0.7% |
| Test Example 50 | SUS430 | 10 μm | 0.6% |
| Test Example 51 | SUS631 | 10 μm | 0.6% |
| Test Example 52 | SUS302 | 50 μm | 1.3% |
| Test Example 53 | SUS321 | 50 μm | 1.4% |
| Test Example 54 | SUS347 | 50 μm | 1.2% |
| Test Example 55 | SUS15-7PH | 50 μm | 1.3% |
| Test Example 56 | SUS17-7PH | 50 μm | 1.2% |

As is apparent from Table 5, irrespective of any material of the stainless steel, where the sealing plate was 30 μm or less in thickness, an incidence rate of cracks was 1% or less. Where the sealing plate was 30 μm or more in thickness, an incidence rate of cracks was in excess of 1%. In particular, the incidence rate of cracks was decreased with a decrease in thickness and the incidence rate of cracks was increased with an increase in thickness.

These results apparently showed that the thickness of the sealing plate was proportionally related to the incidence rate of cracks. It was confirmed that the thinner the thickness was, the more greatly the incidence rate of cracks was suppressed. It was also confirmed that the sealing plate was made 30 μm or less in thickness to suppress the incidence rate of cracks to 1% or less, which was particularly effective.

(Sixth Evaluation Test)

Next, an evaluation test was made for a relationship between wall thickness T (μm) of peripheral wall portion of a container main body, welded diameter φ (μm) of a welded part on welding and incidence rate of cracks. The results are shown in Table 6 and Table 7.

In the evaluation test, a sealing plate was formed with stainless steel of SUS 304 with the thickness of 20 μm. First, with the welded diameter φ of the welded part given 190 μm, the peripheral wall portion of the container main body was changed in wall thickness T to carry out the evaluation test. The results are shown in Table 6.

Next, with the wall thickness T of the peripheral wall portion of the container main body given 400 μm, the welded part was changed in welded diameter φ to carry out the evaluation test. The results are shown in Table 7.

φ, which was effective in suppressing the incidence rate of cracks. It was confirmed from Table 6 and Table 7 that the incidence rate of cracks was 1% or less when a relationship of [(welded diameter y/wall thickness T)<0.5] was satisfied.

TABLE 6

|  | Material of sealing plate | Thickness of sealing plate | Welded diameter φ | Wall thickness T of peripheral wall portion | Welded diameter/ thickness | Incidence rate of cracks |
|---|---|---|---|---|---|---|
| Test Example 57 | SUS304 | 20 μm | 190 μm | 400 μm | 0.48 | 0.50% |
| Test Example 58 | SUS304 | 20 μm | 190 μm | 450 μm | 0.42 | 0.30% |
| Test Example 59 | SUS304 | 20 μm | 190 μm | 350 μm | 0.54 | 62.00% |
| Test Example 60 | SUS304 | 20 μm | 190 μm | 300 μm | 0.63 | 78.00% |
| Test Example 61 | SUS304 | 20 μm | 190 μm | 250 μm | 0.76 | 100.00% |

TABLE 7

|  | Material of sealing plate | Thickness of sealing plate | Welded diameter φ | Wall thickness T of peripheral wall portion | Welded diameter/ thickness | Incidence rate of cracks |
|---|---|---|---|---|---|---|
| Test Example 62 | SUS304 | 20 μm | 190 μm | 400 μm | 0.48 | 0.50% |
| Test Example 63 | SUS304 | 20 μm | 170 μm | 400 μm | 0.43 | 0.30% |
| Test Example 64 | SUS304 | 20 μm | 150 μm | 400 μm | 0.38 | 0.20% |
| Test Example 65 | SUS304 | 20 μm | 130 μm | 400 μm | 0.33 | 0.10% |
| Test Example 66 | SUS304 | 20 μm | 110 μm | 400 μm | 0.28 | 0.10% |
| Test Example 67 | SUS304 | 20 μm | 210 μm | 400 μm | 0.53 | 100.00% |
| Test Example 68 | SUS304 | 20 μm | 230 μm | 400 μm | 0.58 | 100.00% |
| Test Example 69 | SUS304 | 20 μm | 250 μm | 400 μm | 0.63 | 100.00% |

Table 6 apparently showed that the thinner the wall thickness T of the peripheral wall portion, the higher the incidence rate of cracks was. Further, as is apparent from Table 7, it was confirmed that the incidence rate of cracks was increased with an increase in welded diameter φ.

Above findings confirmed that the peripheral wall portion was formed so as to be great in wall thickness T and the welded part was formed so as to be small in welded diameter (Seventh Evaluation Test)

Next, an evaluation test was made for a relationship between the number of weldings and poor welding. The results are shown in Table 8.

In this evaluation test, comparison was made for a case where welding was carried out once and a case where welding was carried out twice under the same conditions as those of Test Example 57 shown in Table 6. After welding, a binocular stereoscopic microscope was used to carry out a macroscopic examination, thereby confirming whether poor welding was found or not.

TABLE 8

|  | Material of sealing plate | Thickness of sealing plate | Welded diameter φ | Wall thickness T of peripheral wall portion | Welded diameter/ thickness | Number of welding | Incidence rate of cracks | Poor welding |
|---|---|---|---|---|---|---|---|---|
| Test Example 70 | SUS304 | 20 μm | 190 μm | 400 μm | 0.48 | Once | 0.50 | 2% |
| Test Example 71 | SUS304 | 20 μm | 190 μm | 400 μm | 0.48 | Twice | 0.50 | 0% |

Table 8 apparently confirmed that where welding was carried out twice, there was found a decrease in incidence rate of poor welding. It was, thereby, confirmed that welded parts on a first welding and welded parts on second welding can be continuously overlapped with each other.

The present invention relates to an electrochemical cell which is provided with a hermetic container having a base member, a jointing material fixed to the base member, and a lid member welded via the jointing material to the base member, and in which a housing space sealed between the base member and the lid member is defined, and an electrochemical element which is housed inside the housing space and which is available to effect charging and discharging, wherein the lid member is stainless steel. According to the present invention, since the stainless steel-made lid member is welded on the base member to seal the electrochemical element inside the housing space, it is possible to suppress a decrease in charging efficiency due to an increase in leakage current on charging. Therefore, it is possible to provide an electrochemical cell which is stable in quality over a long period of time and also excellent in cycle characteristics on charging and discharging.

What is claimed is:

1. An electrochemical cell comprising:
   a hermetic container having a base member, a jointing material fixed to the base member and a lid member welded on the base member via the jointing material, and in which a sealed housing space is formed between the base member and the lid member is defined; and
   an electrochemical element which is housed inside the housing space and which is available to effect charging and discharging, wherein
   the base member is formed in the shape of a closed-end tube having a flat-plate-like bottom wall portion and a frame-like peripheral wall portion,
   the lid member being made of stainless steel and having a thickness less than or equal to 30 μm and
   the peripheral wall portion of the base member has a wall thickness equal to or greater than 400 μm.

2. The electrochemical cell according to claim 1, wherein a metal layer which is composed of a metal material selected from any one of Au, Sn, Cu, Ag, Ir, Pd and Rh or an alloy containing at least one of these metal materials is coated at a part which is in contact with at least an electrode of the electrochemical element on the surface of the lid member.

3. The electrochemical cell according to claim 2, wherein the metal layer is coated all over at the part which is in contact with the jointing material.

4. The electrochemical cell according to claim 2, further comprising a primer layer which is composed of Ni or Cu and which is formed between the metal layer and the lid member.

5. The electrochemical cell according to claim 1, wherein the jointing material is an electrically-conductive seal ring which is formed in the shape of a ring so as to surround the housing space.

6. The electrochemical cell according to claim 5, wherein an outer peripheral part of the lid member is in alignment with an outer peripheral part of the seal ring.

7. The electrochemical cell according to claim 5, wherein the seal ring is greater in thickness than the lid member.

8. The electrochemical cell according to claim 1, wherein
   the lid member is welded on an upper surface of the peripheral wall portion of the base member via the jointing material by seam welding in which welded parts are overlapped continuously on a boundary surface between the lid member and the jointing material, and
   a wall thickness T (μm) of the peripheral wall portion and a welded diameter φ (μm) of the welded parts satisfy the following formula (I)

$$\frac{\text{Welded diameter } \varphi}{\text{Wall thickness } T} < 0.5. \tag{1}$$

9. The electrochemical cell according to claim 8, wherein the lid member is welded by repeating the seam welding several times.

* * * * *